United States Patent [19]

Hintermayer et al.

[11] Patent Number: 5,114,693
[45] Date of Patent: May 19, 1992

[54] PROCESS FOR THE PRODUCTION OF SILICON NITRIDE AND PRODUCT MADE ACCORDING TO THE PROCESS

[75] Inventors: Jochen Hintermayer; Ernst Graf, both of Trostberg; Werner Gmohling, Hufschlag; Georg Schroll, Palling; Wolfgang Kobler, Trostberg, all of Fed. Rep. of Germany

[73] Assignee: SKW Trostberg Aktiengesellschaft, Trostberg, Fed. Rep. of Germany

[21] Appl. No.: 666,225

[22] Filed: May 9, 1991

Related U.S. Application Data

[63] Continuation-in-part of Ser. No. 445,001, Dec. 4, 1989, abandoned.

[30] Foreign Application Priority Data

Dec. 8, 1988 [DE] Fed. Rep. of Germany ....... 3841311

[51] Int. Cl.$^5$ .............................................. C01B 21/06
[52] U.S. Cl. ...................................... 423/344; 423/406
[58] Field of Search ................................ 423/344, 406

[56] References Cited

FOREIGN PATENT DOCUMENTS 0252597 12/1987 Fed. Rep. of Germany ...... 423/344
3151603 6/1988 Japan ................................... 423/344
3170203 7/1988 Japan ................................... 423/344

*Primary Examiner*—Olik Chaudhuri
*Assistant Examiner*—Ken Horton

[57] ABSTRACT

The present invention provides a process for the production of silicon nitride by the reaction of silicon and nitrogen, wherein, in one reaction step, silicon powder is reacted with nitrogen which continuously rotates at a temperature of from 1000° to 1800° C. and at a pressure of from 1.01 to 1.8 bar up to a nitrogen content of 1 to 39.5% by weight.

The present invention also provides a silicon nitride produced by this process wherein it is obtained in porous form and has the following properties.
 a) grain size of 0.1 to 20 mm.
 b) nitrogen content of 1 to 39.5% by weight,
 c) oxygen content of 1%,
 d) ratio of $\alpha{:}\beta$-phase of 1:9 to 9:1.

15 Claims, No Drawings

PROCESS FOR THE PRODUCTION OF SILICON NITRIDE AND PRODUCT MADE ACCORDING TO THE PROCESS

CROSS-REFERENCE TO RELATED APPLICATION

This application is a continuation-in-part of U.S. application Ser. No. 445,001 filed on Dec. 4, 1989 abandoned.

The present invention is concerned with a process for the production of silicon nitride, as well as a product obtained by this process.

Silicon nitride is of increasing interest as a ceramic work material with high temperature stability which can be used for a large variety of purposes. In many fields of use, it has already replaced metals and metal alloys. Thus, for example, this work material is used in the case of parts which are subjected to high temperature stressing and are used in the construction of engines. In the meantime, silicon nitride has also proved to be useful in the construction of chemical apparatus since it not only has a high resistance to changes of temperature but is also resistant to the influence of chemicals. In the metallurgical industry, silicon nitride is a key component of pouring spouts, ladles, tapping spouts and the like. The properties of objects formed from silicon nitride are largely determined by its purity.

For the production of such objects, there is normally used a silicon nitride which not only has a high degree of purity but also a high proportion of $\alpha$-phase. Numerous processes are known which, starting from different raw materials, lead to silicon nitride. Thus, for example, European Patent Specification No. 0,082,343 describes the production of silicon nitride by the reaction of silicon dioxide in the presence of carbon with nitrogen at a temperature of from 1350° to 1550° C. From European Patent Specification No 0,206,795, there is known the production of a finely-divided silicon nitride with a high proportion of $\alpha$-phase in which, as starting materials, there are used silicon oxide and carbon, as well as possibly silicon powder and/or silicon nitride, which are heated in an atmosphere of nitrogen of not less than 2 bar to a temperature of from 1400° to 1800° C. A disadvantage of these processes is the relatively high proportions of impurities so that further purification steps are necessary in order to obtain a uniform product.

In European Patent Specification No. 0,186,497, there is described a production process in which finely-divided silicon with a grain size of less than 150 mesh is reacted at a temperature of from 1200° to 1400° C. with nitrogen which is possibly mixed with an inert gas. In order to obtain the highest possible proportion of $\alpha$-silicon nitride, it is necessary to adjust the temperature of the strongly exothermal reaction to the range of from 1300° to 1400° C. (cf. also Federal Republic of Germany Patent Specification No. 23 50 031, page 1, paragraph 3). According to the Process of European Patent Specification No. 0,186,497, the maintenance of the temperature range of 1200° to 1400° C. is achieved by reaction at a low pressure until about 50% of the metallic silicon has reacted. According to this process, it is admittedly possible to produce an $\alpha$-silicon nitride of high purity but the production of a reaction furnace operated at a low pressure and at a temperature of from 1200° to 1400° C. requires a high technical expense. Furthermore, the continuous operation of a furnace at differing gas pressures is problematical. It is an object of the present invention to provide a process for the production of silicon nitride which can be carried out without problems even on a large scale in which the product produced is obtained in porous form.

Thus, according to the present invention, there is provided a process for the production of silicon nitride by the reaction of silicon and nitrogen, wherein, in one reaction step, silicon powder is reacted with nitrogen while being continuously rotated at a temperature of from 1000° to 1800° C. and at a pressure of 1.01 to 1.8 bar up to a nitrogen content of from 1 to 39.5% by weight and preferably of from 5 to 25% by weight.

The silicon nitride obtained in this manner is obtained in porous form and has the following properties:

a) grain size of 0.1 to 20 mm.,
b) nitrogen content of from 1 to 39.5% by weight,
c) oxygen content of $<1\%$,
d) ratio of $\alpha:\beta$-phase of 1:9 to 9:1.

The silicon nitride thereby usually has a nitrogen content of from 5 to 25% by weight and a ratio of $\alpha:\beta$-phase of 1:1 to 9:1.

Surprisingly, we have found that the difficulties in the case of the production of finely-divided silicon nitride powder can be avoided when a nitrided porous granulate is produced which has possibly been fully nitrided through in a second reaction step and comminuted to the desired fineness.

The process according to the present invention for the production of the porous silicon nitride is carried out in such a manner that, in one reaction step, finely-divided silicon powder with a grain size of $<45$ $\mu$m and preferably of $<20$ $\mu$m is reacted, with continuous rotation, with nitrogen at a temperature of from 1000° to 1800° C. and under a slightly increased pressure of from 1.01 to 1.8 bar up to a nitrogen content of from 1 to 39.5% by weight and especially of from 5 to 25% by weight. Other than reducing silicon particulates to the proper size by powdering, the silicon powder employed in the present invention is prepared without any further processing such as granulation.

According to a preferred embodiment of the process according to the present invention, the partially nitrided product is reacted in a second step at a temperature of from 1100° to 1600° C. with a mixture of nitrogen and gas which is inert towards the product up to the completion of the take up of nitrogen.

The nitriding of the finely-divided silicon with nitrogen preferably takes place in an externally heated rotating tube so that, due to the movement of the product, the nitrogen continuously has a new point of attack on the silicon particles. It is thereby ensured that the heat of reaction due to the exothermal reaction is immediately given off to the rotating tube and thus an overheating of the reaction material is avoided. The use of a furnace with overlying beds with incorporated circulating means is, for example, also possible. By the use of a slight overpressure in this reaction step, there is prevented the ingress of atmospheric oxygen and thus the formation of undesired oxygen-containing silicon compounds.

The use of a slight overpressure does not present any special sealing problems even in the case of temperatures of up to 1800° C. in the reaction zone. The flow-through rate of the silicon or, when the silicon nitride is to be nitrided through in two reaction steps, of the partly nitrided silicon through the rotating tube is so adjusted that the product at the outlet has a nitrogen content of from 1 to 39.5% by weight and especially of from 5 to 25% by weight. The time necessary for this purpose is from 2 to 60 minutes. In general, a time of from 20 to 45 minutes suffices in order to achieve the desired take-up of nitrogen. The resultant, substantially spheroidal, porous granulate has a grain size of from 0.1 to 20 mm and is cooled to ambient temperature under the same gas atmosphere as prevails in the rotating tube. By variation of the reaction conditions, for example of the angle of inclination and of the speed of rotation of the rotating tube, the grain band of the granulate can be displaced to smaller or higher values, whereby the porosity and bulk density thereof are also changed within certain limits.

According to a preferred embodiment of the process according to the present invention, the silicon is partly nitrided in a first step and thereafter the partly nitrided granulated is fully nitrided in a gas-tight furnace, preferably in a so-called chamber furnace, at a temperature of from 1100° to 1600° C. in a stationary bed. As reaction medium there is used a mixture of nitrogen and a noble gas or hydrogen. There is preferably used nitrogen in admixture with argon, in which case the proportion of nitrogen can, depending upon the nitrogen content of the starting material, vary between 30 and 100% by volume. In a preferred embodiment, the proportion of nitrogen in the reaction gas can be adjusted to a value of from 30 to 70% by volume and increased according to the progress of the reaction up to 100% by volume. In the case of an already relatively high nitrogen content of the partly nitrided product, there is used a gas with a higher content of nitrogen than in the case of a starting material with a lower content of nitrogen. The nitriding is continued until the nitrogen consumption per unit time has dropped to practically zero, whereafter the product is fully nitrided through and has achieved a nitrogen content of up to 39.5%. The silicon nitride granulate thus obtained is present with a loose bulk; it has not sintered together and can, therefore, easily be ground to the desired grain size.

The porous substantially spheroidal granulate has, as a rule, a bulk density of from 0.5 to 1.5 g./cm$^3$, a pore volume of 30 to 80% and is obtained with a granulation of 0.1 to 20 mm and preferably of 1 to 10 mm. The silicon nitride produced according to the present invention does not require an further purification steps by leaching out with inorganic acids. A prerequisite for the achievement of such a highly pure silicon nitride is, of course, also the use of correspondingly pure silicon powder. This should have a content of silicon of at least 95%. For the production of silicon nitride which can be used technically, in general it is sufficient to use a starting material with 95 to 99.8% of silicon and preferably of about 97.5% silicon. However, for special qualities, there can also be used a silicon metal with a degree of purity of 99.8%.

According to the intended use the ration of $\alpha$:$\beta$-phase in the product can be influenced by appropriate control of the reaction temperature and is generally varied in the ratio of from 1:9 to 9:1. The partly nitrided product obtained in the first reaction step with a nitrogen content of 5 to 25% by weight usually has an $\alpha$:$\beta$-phase ratio of 1:1 to 9:1.

The silicon nitride produced according to the process of the present invention at a temperature of from 1300° to 1400° C. consists of 87% of $\alpha$-phase and 13% of $\beta$-phase. It is outstandingly suitable for the production of pressed bodies or as component of high temperature-resistant formed bodies.

For particular silicon nitride qualities, for example those with higher proportions of $\beta$-phase, the nitriding temperature in the second reaction step can be increased to up to 1600° C.

EXAMPLE 1

Silicon powder with a grain size of between 40–45 $\mu$m and a purity of 99.5% silicon was continuously introduced into a rotating tube through which flowed nitrogen (99.99% nitrogen). The 400 mm long reaction zone of the tube was heated to a temperature of 1350° C. In the case of a nitrogen pressure of 1.1 bar and a residence time of 30 minutes, the reaction results in a porous, substantially spheroidal granulate with a grain size of from 1 to 5 mm and a nitrogen content of 10 to 12% by weight. After transfer of this granulate to a gas-tight chamber furnace with a nitrogen/argon atmosphere, the nitrogen/argon ratio thereby being controlled according to the progress of the reaction (in the case of a rapid course of the reaction, a smaller proportion of nitrogen in the gas mixture than in the case of a slower course of the reaction), the product was completely nitrided within the course of 48 hours at a temperature of from 1300° to 1400° C. The nitrogen content of the silicon nitride obtained was 39.5% (theoretical nitrogen content 39.96%) and the form of the granulate was fully maintained. The porosity, determined by the capillary pressure method (mercury porosimetry), was 60%.

By means of a treatment for 24 hours of the product obtained with concentrated hydrochloric and hydrofluoric acid at 80° C., neither a change of weight nor a change of shape took place.

The silicon nitride obtained was ground in a vibrating disc mill to a grain size of $<20$ $\mu$m. The analysis of the product gave the following values:

silicon total: 59.3%
silicon free: 0.2%
nitrogen: 39.4%
carbon: 0.04%
iron: 0.2%
aluminium: 0.15%
oxygen: 0.64%

The phase analysis showed a proportion of 85% $\alpha$-silicon nitride, the remaining part being in the $\beta$-modification.

EXAMPLE 2

Silicon powder with a grain size of $<45$ $\mu$m and a content of silicon of 95.5% was introduced continuously into a rotating furnace with a reaction zone of 400 mm length which was maintained at a temperature of 1380° C. The speed of rotation of the tube was 3 r.p.m. and the nitrogen pressure was 1.22 bar. The period of residence of the product in the rotating tube, the total length of which was 1500 mm., amounted to 35 minutes. The partly nitrided product had a nitrogen content of 9.2%, lay in the grain range of 1 to 8 mm and had a porosity of 40% (determined according to the capillary pressure method with a low pressure porosimeter).

50 kg. of the partly nitrided granulate obtained was further nitrided in loose packing in a chamber furnace heated to 1600° C. in a nitrogen/argon atmosphere, the ratio of nitrogen to argon initially being 1:2. Within the course of 8 hours, the temperature of furnace was lowered to 1350° C. and left at this temperature for a further 16 hours, the proportion of nitrogen in the reaction gas being increased to 100% nitrogen depending upon the progress of the reaction. After this time, a silicon nitride containing an average of 38.2% nitrogen was removed from the furnace as loosely porous granulate.

The phase analysis showed a content of the α-modification of 55% and 45% of the product was present as the β-phase. Example 2 illustrates how the α:β-phase ratio can be influenced by the nitriding temperature.

EXAMPLE 3

Silicon powder with a grain size of between 40–45 μm and a silicon content of 99% was introduced continuously into a rotating tube furnace. In the rotating tube, there prevailed a pure atmosphere of nitrogen with a nitrogen partial pressure of 1.1 bar and a temperature of 1350° C. The speed of rotation of the rotating tube was 3 r.p.m. and the heated zone had a length of 400 mm. The period of residence of the powder in the rotating tube was 10 minutes. A porous agglomerate resulted with a diameter range of 2 to 5 mm and an average nitrogen content of 6.7±0.2% by weight.

The phase analysis showed an α-content of 90%.

EXAMPLE 4

Silicon powder with a grain size of <20 μm and a content of silicon of 98.5% was introduced continuously into a rotating tubular furnace. The reaction zone had a temperature of 1400° C., and a length of 400 mm. The rate of rotation of the tube was 1.5 r.p.m. and the nitrogen partial pressure was 1.01 bar. The period of residence of the product in the reaction zone was 45 minutes. The final product was a porous granulate which lay within the grain band of 0.5 to 3 mm. The porosity was 45% and the nitrogen content was 39.2% by weight.

The phase analysis showed a content of the β-modification of 70%.

We claim:

1. A process for the production of silicon nitride by the reaction of silicon and nitrogen, said process comprising the step of:
   reacting silicon powder having a particle size of less than 45 microns and a silicon content of at least 95% with nitrogen while said silicon is continuously rotated at a temperature of from 1000° C. to 1800° C. and at a pressure of from 1.01 to 1.8 bar to produce silicon nitride having a nitrogen content of from 1 to 39.5% by weight and a ratio of α:β-phase of 1:9 to 9:1.

2. A process according to claim 1, wherein the reaction is carried out up to a nitrogen content of from 5 to 25% by weight.

3. A process according to claim 1, wherein the reaction is carried out in a rotating tube.

4. A process according to claim 1, wherein a silicon powder is used with a grain size of less than 20 microns.

5. A process according to claim 1, wherein a silicon powder is used with a silicon content greater than 97.5%.

6. A process according to claim 1 wherein said step of reacting silicon powder With nitrogen is continued for a period of from 2 to 60 minutes.

7. The process of claim 1, wherein said step of reacting silicon powder with nitrogen is further characterized in that said step is allowed to continue only up to the production of a partly nitrided product having a nitrogen content of from 5 to 25% by weight and after said step of reacting silicon powder with nitrogen said process further includes the step of reacting the partly nitrided product at a temperature of 1100° C. to 1600° C. with nitrogen gas.

8. The process of claim 7 wherein the step of reacting said partly nitrided product is further characterized in that said partly nitrided product is reacted with a mixture of nitrogen and an inert gas, wherein the concentration of said nitrogen and said inert gas in said mixture change as said step of reacting said partly nitrided product continues to completion.

9. The process according to claim 8 wherein said step of reacting the partly nitrided product is carried out in a chamber furnace in a stationary bed.

10. The process of claim 8 wherein said step of reacting said partly nitrided product is further characterized in that said inert gas in said mixture is argon.

11. The process of claim 8 wherein the step of reacting the partly nitrided product is further characterized in that the proportion of nitrogen in said mixture is adjusted to 30 to 70% by volume and increased to 100% by volume of nitrogen as said step of reacting the partly nitrided product continues to completion.

12. The process of claim 1 wherein the step of reacting silicon powder with nitrogen is carried out up to a nitrogen content of from 5 to 25% by weight.

13. Silicon nitride produced according to the process of claim 1.

14. Silicon nitride produced according to the process of claim 7.

15. Silicon nitride produced according to the process of claim 7.

* * * * *